(12) United States Patent
Gwozdek et al.

(10) Patent No.: US 8,393,423 B2
(45) Date of Patent: Mar. 12, 2013

(54) METHOD AND SYSTEM TO PREVENT VEHICLE DRIVEAWAY DURING BATTERY CHARGING

(75) Inventors: Thomas M. Gwozdek, Plymouth, MI (US); James A. Lathrop, Saline, MI (US); Karin Lovitt, Novi, MI (US); Jerry Mils, Harrison Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 701 days.

(21) Appl. No.: 12/487,069

(22) Filed: Jun. 18, 2009

(65) Prior Publication Data

US 2010/0320018 A1    Dec. 23, 2010

(51) Int. Cl.
*B60W 10/24* (2006.01)

(52) U.S. Cl. .............. 180/65.27; 180/65.21; 320/107

(58) Field of Classification Search .............. 180/65.27, 180/65.1, 65.21; 320/107
See application file for complete search history.

(56) References Cited

U.S. PATENT DOCUMENTS

| | | | |
|---|---|---|---|
| 3,898,547 A | 8/1975 | Poole | |
| 4,722,427 A | 2/1988 | Prumbaum et al. | |
| 5,220,268 A | 6/1993 | Rose et al. | |
| 5,403,078 A | 4/1995 | Farr | |
| 5,954,179 A | 9/1999 | Osborn | |
| 6,724,100 B1 * | 4/2004 | Gabriel | 307/9.1 |
| 7,791,217 B2 * | 9/2010 | Kamaga | 307/9.1 |
| 7,859,219 B2 * | 12/2010 | Harris | 320/104 |
| 7,960,857 B2 * | 6/2011 | King | 307/10.1 |
| 8,025,526 B1 * | 9/2011 | Tormey et al. | 439/528 |
| 8,028,780 B2 * | 10/2011 | Sagawa et al. | 180/65.27 |
| 8,054,048 B2 * | 11/2011 | Woody et al. | 320/162 |
| 8,063,757 B2 * | 11/2011 | Frey et al. | 340/455 |
| 8,072,184 B2 * | 12/2011 | Bhade et al. | 320/109 |
| 8,075,329 B1 * | 12/2011 | Janarthanam et al. | 439/304 |
| 8,076,905 B2 * | 12/2011 | Ko et al. | 320/134 |
| 8,098,041 B2 * | 1/2012 | Kokotovich et al. | 320/107 |
| 8,108,161 B2 * | 1/2012 | Tomura et al. | 702/63 |
| 8,111,043 B2 * | 2/2012 | Redmann | 320/109 |
| 2006/0132085 A1 | 6/2006 | Loubeyre | |

OTHER PUBLICATIONS

Enova Systems, Hybrid School Bus—Operator's Manual, Document No. SV400001R-, revised Apr. 3, 2007.

* cited by examiner

*Primary Examiner* — Jeffrey J Restifo
(74) *Attorney, Agent, or Firm* — David B. Kelley; Brooks Kushman P.C.

(57) ABSTRACT

A system and method are disclosed for preventing driveaway or roll away of a plug-in electric vehicle when it is being charged or is coupled to an external power supply cord. When it is detected based on at least one of the following conditions: a current is flowing to the battery charger, a voltage source is coupled to the battery charger, an access door allowing access to the receptacle on board the vehicle is open and/or a plug detect switch indicates that a plug is coupled with the receptacle, a mechanical restraint on the driveline is prevented from being released. The mechanical restraint may be a parking brake. Alternatively, the mechanical restraint may include preventing the gear shift selector from being moved out of the park position.

11 Claims, 6 Drawing Sheets

METHOD AND SYSTEM TO PREVENT VEHICLE DRIVEAWAY DURING BATTERY CHARGING

BACKGROUND

1. Technical Field

The present disclosure relates generally to charging batteries on-board automotive vehicles.

2. Background Art

In response to concerns about dwindling petroleum supplies, manufacturers of automotive vehicles are developing hybrid electric vehicles, electric vehicles, and plug-in hybrid electric vehicles (PHEVs), the latter two deriving all or some of their power from an electrical grid during a charging operation. Such vehicles are equipped with a battery charger connected to a receptacle into which an external power supply cord can be plugged for charging an on-board battery pack. It is desirable to prevent driveaway of the vehicle when such an external power supply cord is connected to the vehicle. An electric-vehicle battery-charger interlock system that disallows the electric motor from propelling the vehicle while charging is disclosed in U.S. Pat. No. 3,898,547. However, such a system does not prevent vehicle movement due to rolling under the action of gravity or due to propulsion by a secondary power source, such as an internal combustion engine provided in a PHEV.

SUMMARY

A method and system to prevent vehicle movement when a battery onboard the vehicle is being charged by an external grid are disclosed. When a vehicle condition is detected indicating that an external power supply cord may be plugged into the receptacle on the vehicle, a mechanical restraint applied to a driveline of the vehicle is prevented from being released.

The condition indicating that an external power supply cord is plugged into the receptacle can be based on a voltage source coupled to the battery charger. Alternatively, the condition is based on flow of current to the battery charger. In another embodiment, the receptacle with which an external power source is coupled has an access door with a switch indicating whether it is open or closed. The condition can be based on the access door being open. In yet another alternative, the condition can be based on a plug detect switch, which in one example includes a pin switch that is depressed when a plug is coupled with the receptacle.

If the condition is indicated due to the fact that the access door is open that does not necessarily mean that the external supply cord is plugged into the receptacle. For example, the access door being open indicates the condition, although the external power supply cord may not actually be plugged in. Nevertheless, according to an embodiment of the disclosure, the vehicle is prevented from driveaway until the access door is determined to be closed regardless of whether an external power supply cord is plugged in. In regards to the plug detector, it is possible that a pin switch on the receptacle may be depressed by something other than a plug of an external power supply cord. The pin switch being depressed indicates the condition whether or not the cord is plugged-in.

If the condition is detected, the vehicle is prevented from moving. In one alternative, the vehicle's parking brake is disallowed from being released. The parking brake may be a mechanical, operator-actuated brake or an electrically-actuated brake. In another alternative, the gear shift selector can be prevented from being moved out of park.

An operator of an electric vehicle depends on the ability to charge the batteries from an external power source to have continued use of the vehicle. An advantage of the present disclosure is that it prevents at least one source of damage to the external power supply cord and the vehicle's receptacle by preventing driveaway of the vehicle while the cord is plugged in. Furthermore, according to an embodiment of the disclosure, rolling of the vehicle is also prevented, whether it is inadvertent by forgetting to set a parking brake or intentional rolling of the vehicle, e.g., towing or rolling on an incline.

According to an embodiment of the disclosure, the operator of the vehicle is informed audibly or by an illuminated indicator light as to why the vehicle cannot be driven away, i.e., that the external charging system needs attention.

DETAILED DESCRIPTION

As those of ordinary skill in the art will understand, various features of the embodiments illustrated and described with reference to any one of the Figures may be combined with features illustrated in one or more other Figures to produce alternative embodiments that are not explicitly illustrated or described. The combinations of features illustrated provide representative embodiments for typical applications. However, various combinations and modifications of the features consistent with the teachings of the present disclosure may be desired for particular applications or implementations. Those of ordinary skill in the art may recognize similar applications or implementations whether or not explicitly described or illustrated.

Figure 1:
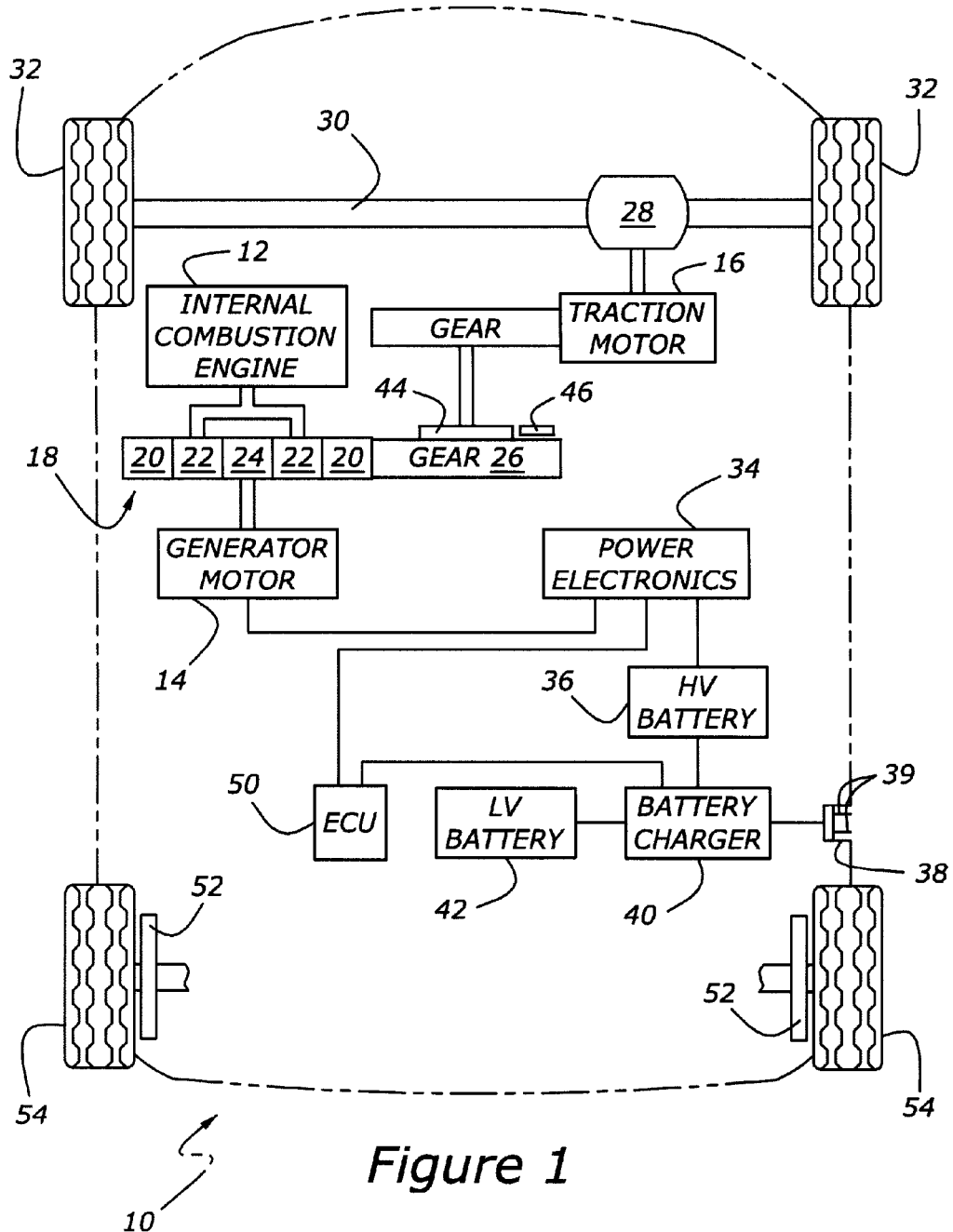
FIG. 1 is a schematic representation of a plug-in hybrid electric vehicle.

An example configuration of a PHEV 10 is shown schematically in FIG. 1. PHEV 10 has at least two propulsion sources: an internal combustion engine 12 and a generator motor 14. In one embodiment, traction motor 16 may also be used to propel PHEV 10. Engine 12 and generator motor 14 are coupled to transmission 18. In one exemplary configuration, transmission 18 is a planetary gear set having a ring gear 20, planetary gears 22, and sun gear 24 with planetary gears 22 coupled to engine 12 and sun gear 24 coupled to generator motor 14. Ring gear 20 is coupled to a gear 26. Gear 26, differential 28, and half shafts 30 can be considered the final drive. Half shafts 30 are connected to driving wheels/tires 32.

FIG. 1 also schematically illustrates the major electrical components in PHEV 10. Generator motor 14 and traction motor 16 interact with power electronics 34. Both generator motor 14 and traction motor 16 can be operated in a mode in which electrical energy is converted into mechanical energy and a mode in which mechanical energy is converted into electrical energy. The reservoir for the electrical energy is the high voltage battery 36. High voltage battery 36 can be supplied electrical energy from an external source via receptacle 38 with a battery charger 40 converting an AC supply to DC for battery storage. Typically, PHEV 10 also includes a low voltage battery 42 to power vehicle accessories such as lights, gauges, etc. PHEV 10 has an electronic control unit (ECU) electronically coupled to at least power electronics 34 and battery charger 40.

To lock the final drive when the car is placed in park, a parking gear wheel 44 is provided. In FIG. 1, parking gear wheel 44 is coupled to gear 26 such that when parking gear wheel 44 is locked, gear 26 is also locked thereby locking wheels/tires 32. Rotation of parking gear wheel 44 is prevented when parking pawl 46 is pressed in between two teeth of parking gear wheel 44. As shown in FIG. 1, parking pawl 46 is disengaged from parking gear wheel 44 thereby allowing free rotation of gear 26, differential 28, half shafts 30 and wheels/tires 32. A parking pawl is described in more detail in U.S. Pat. No. 4,722,427 that is incorporated by reference herein in its entirety.

Figures 2, 5:
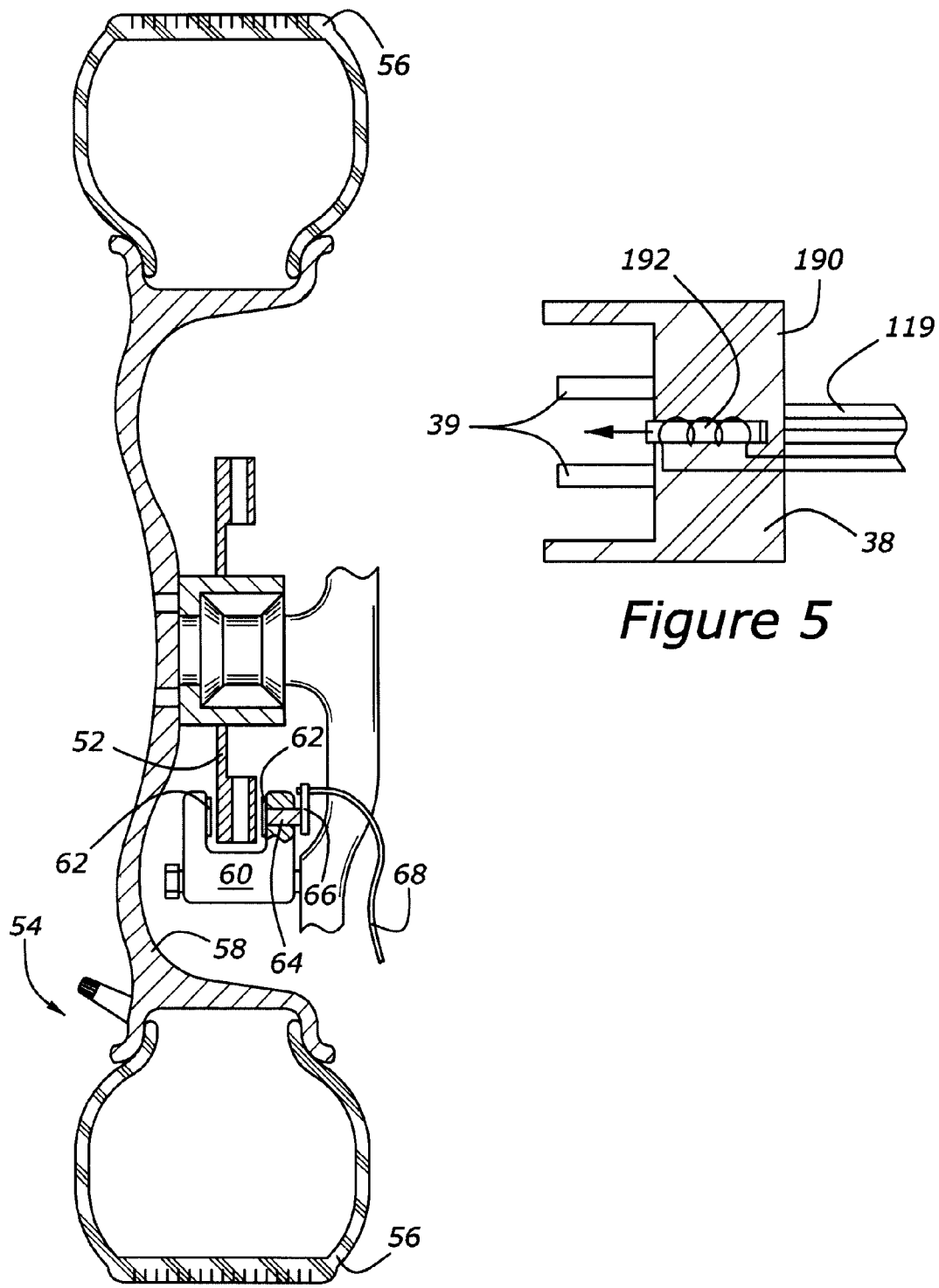
FIG. 2 is a schematic representation of a disc braking system.
FIG. 5 is a representation of a receptacle configuration according to an alternative embodiment of the present disclosure.

Also shown in FIG. 1 are discs 52 coupled to non-driving wheels/tires 54. Referring now to FIG. 2, a single wheel/tire 54 is shown in cross-section providing more detail. Tire 56 is mounted on wheel 58. Disc 52 is coupled to wheel 58. A caliper 60 has brake pads 62. When the pads 62 of caliper 60 are squeezed toward disc 52, pads 62 contact disc 52. When disc 52 is rotating, the friction between pads 62 and disc 52 causes disc 52 to decelerate thereby braking the rotation of wheel 58. In typical service, pads 62 are acted upon by hydraulically-actuated cylinders (not shown in FIG. 2). These are known by one skilled in the art as service brakes. It is also known to provide an emergency or parking brake. A threaded actuator 64 is provided in caliper 60. Actuator 64, when rotated, causes pads 62 to grip disc 52. Actuator 64 is rotated when crank arm 66 is caused to rotate. Crank arm 66 is attached to a cable 68 which is coupled to a hand brake lever or foot pedal (discussed in more detail in conjunction with FIG. 4) in the vehicle cabin. The operator of the vehicle can set the parking brake, typically, by pulling up on a hand operated lever or by depressing a foot pedal. The parking brake is also released under operator action.

In another alternative, an electric parking brake is provided on the vehicle. An example electric parking brake configuration is shown in U.S. Patent Application 2006/0151260 A1 that is incorporated by reference herein in its entirety.

Figure 3:
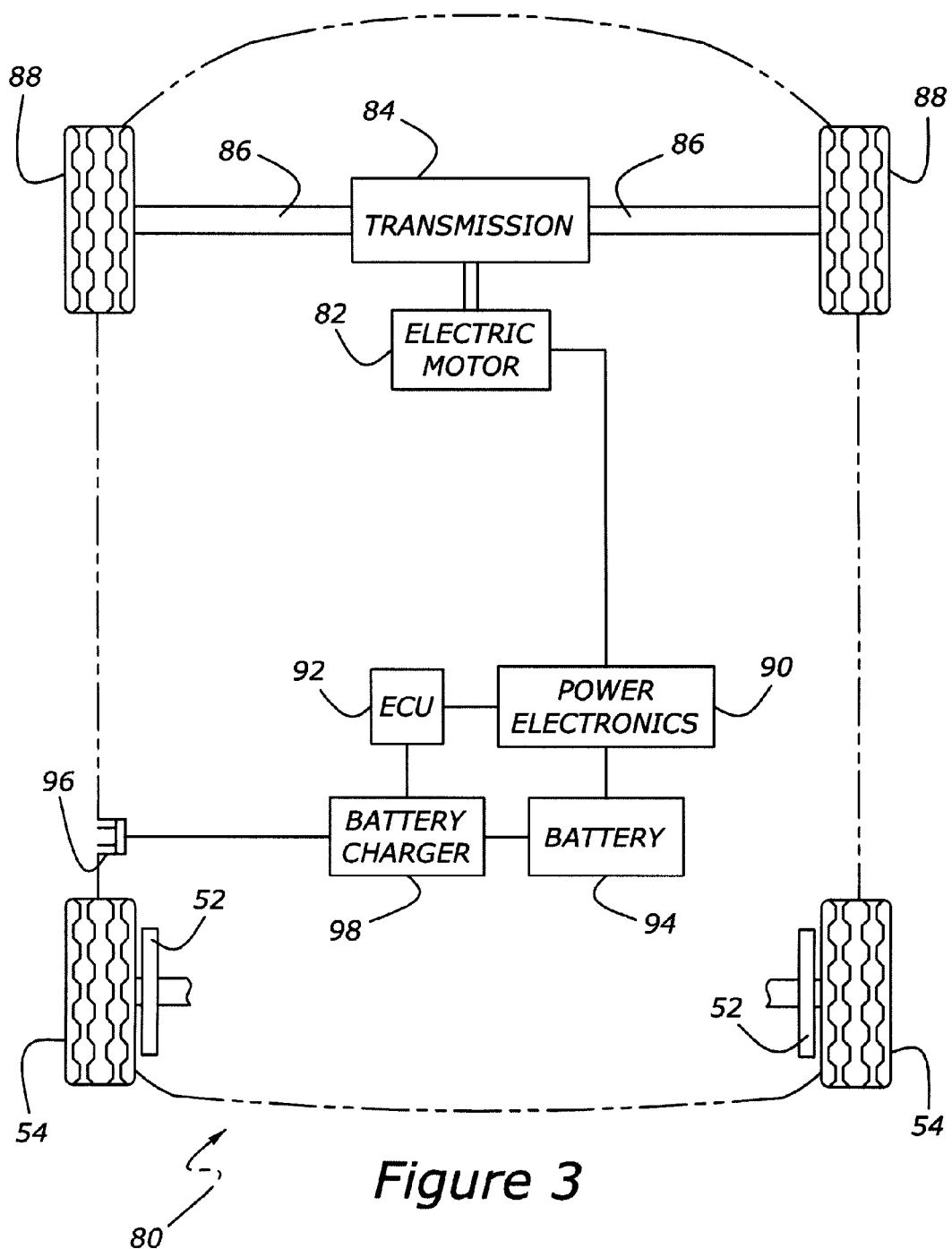
FIG. 3 is a schematic representation of an electric vehicle.

In FIG. 3, an electric vehicle 80 is shown propelled by an electric motor 82 mechanically coupled to a transmission 84, half shafts 86, and wheels/tires 88. Electric motor 82 is electrically coupled to power electronics 90 controlled by ECU 92. Power electronics 90 are coupled to high voltage battery 94. Battery 94 is charged from an external source through receptacle 96 and battery charger 98. Battery charger is also controlled by ECU 92.

Figure 4:
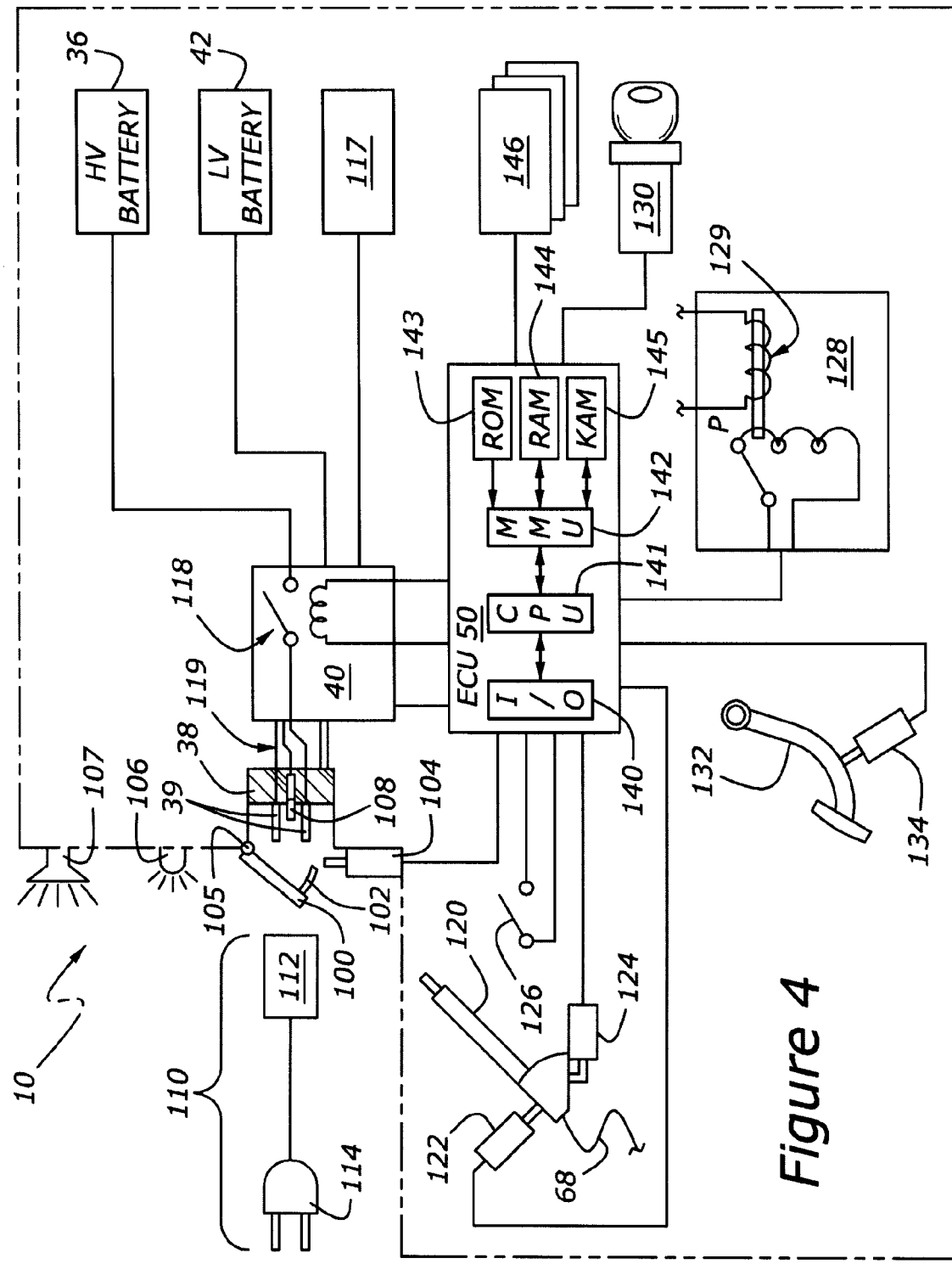
FIG. 4 is a schematic representation of embodiments of the present disclosure.

In FIG. 4, the hardware relevant to some embodiments of the present disclosure is represented schematically. Receptacle 38 is provided on PHEV 10 on an operator-accessible surface of PHEV 10. Alternatively, FIG. 4 can represent an electric vehicle, according to an embodiment of the disclosure. Receptacle 38 is protected from ambient contaminants, such as water and dirt, by access door 100. A latch 102 on door 100 prevents door 100 from being opened when door 100 is closed and access door release solenoid 104 engages with latch 102. Furthermore, an access door switch 105 cooperates with door 100 to provide a signal to ECU 50 indicating whether door 100 is closed or open. Access door switch 105 can be: a rotary switch detecting when access door 100 is at an angle indicating it is closed, a pin switch placed near door 100 with door 100 depressing the pin switch when substantially closed, or any other known switch type. Near door 100 is an indicating light 106, which in one embodiment, is illuminated to indicate charging. Many alternatives to an indicating light 106 may be found useful: multiple lights (such as LEDs) in a variety of colors indicating such things as: charging complete, charging in process, a fault in the charging system, charging is not taking place, etc. In yet another alternative, a single indicating light 106 may be used to indicate various conditions by employing flashing patterns. Indicating light 106, in other embodiments, is located anywhere on PHEV 10. Alternatively, or additionally, a speaker 107 supplies a beeping signal to alert the operator to various conditions listed above. In yet another alternative, speaker 107 provides output of recorded speech to indicate the condition to the operator. In one embodiment, receptacle 38 also has a pin switch 108, which is depressed and sends a signal to ECU 50 when a plug is coupled with receptacle 38.

Also shown in FIG. 4 is an external power supply cord 110, which is external to PHEV 10. Cord 110 comprises a plug 112, which can be coupled with receptacle 38, and plug 114, which is a standard plug that can be plugged into a standard 110 Volt outlet. Receptacle 38 is shown having two prongs in a non-limiting example. Receptacle 38 may include ground and sensor prongs.

Also shown in FIG. 4 is battery charger 40 which charges high-voltage battery 36 and/or low-voltage (standard 13.8 V) battery 42. Battery charger 40, in some embodiments, may provide power to other engine accessories 117 such as an engine block heater. In one embodiment, battery charger 40 includes an internal relay 118. When relay 118 is open, charging of high voltage battery 36 is prevented. A control signal from ECU 50 can be supplied to relay 118, the control signal either closing relay 118 to allow charging when ECU 50 determines that conditions are appropriate for charging or opening relay 118 to prevent charging when ECU 50 determines conditions are inappropriate.

According to an embodiment of the present disclosure, several paths of communication between ECU 50 and electrical switches, indicators, or actuators associated with receptacle 38 are formed: ECU 50 is provided a signal concerning whether plug 112 is coupled with receptacle 38; ECU 50 is provided a signal from access door switch 105 concerning whether access door 100 is open or closed; ECU 50 controls indicating light 106; and ECU 50 controls access door release solenoid 104. The electrical conductors between ECU 50 and these elements associated with access door 100, in one embodiment, are directly connected, shown, for example, in regards to access door release solenoid 104. In another embodiment, these conductors are coupled to ECU 50 via battery charger 40, i.e., through a wiring harness 119 to battery charger 40 that is coupled to ECU 50.

Continuing to refer to FIG. 4, PHEV 10 has a parking brake (also referred to as an emergency brake). Brake lever 120 is set and released under operator control. Brake lever 120, as shown in FIG. 4, is a hand brake that pulls on cable 68 when pulled upward. (The other end of cable 68 is shown in FIG. 2.) Alternatively, the parking brake is controlled by a foot pedal. A switch 122 is activated when brake lever 120 is applied. A signal from switch 122 is provided to ECU 50 to indicate whether the parking brake is set. In one embodiment, a parking brake lock solenoid 124 is actuated under control of ECU 50. It is known in the art to have an electric parking brake, which can be controlled either by an operator-controlled switch 126 or under control of ECU 50.

Also shown in FIG. 4 is a gear shift selector 128 for an automatic transmission vehicle. As discussed above in regards to FIG. 1, a parking gear wheel 44 and parking pawl 46 are provided on the vehicle. Pawl 46 engages with a tooth on parking gear wheel 44 when the P, or park, position of gear shift selector 128 is selected by the operator. Gear shift selector 128 is coupled via linkages (not shown) to pawl 46. Pawl 46 is disengaged from parking gear wheel 44 in any other setting of gear shift selector 128. The status of gear shift selector 128 is communicated to ECU 50.

An ignition key switch 130 is also shown in FIG. 4 communicating with ECU 50. The intention of the vehicle operator to drive away is sensed by the key being inserted and turned to the key on position. In vehicles equipped with automatic transmissions, it is common for shifting from the park postion to be predicated on the operator depressing a brake pedal 132 as well as putting ignition key switch 130 in the key on position. Brake pedal 132 closes a switch 134 communicating with ECU 50, I/O 140, CPU 141, MMU 142, ROM 143, RAM 144, KAM 145, and actuators 146.

Continuing to refer to FIGS. 1 and 4, electronic control unit (ECU) 50 is provided to control engine 12. ECU 50 has a microprocessor, called a central processing unit (CPU) 141, in communication with memory management unit (MMU) 142. MMU 142 controls the movement of data among the various computer readable storage media and communicates data to and from CPU 141. The computer readable storage media preferably include volatile and nonvolatile storage in read-only memory (ROM) 143, random-access memory (RAM) 144, and keep-alive memory (KAM) 145, for example. KAM 145 may be used to store various operating variables while CPU 141 is powered down. The computer-readable storage media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by CPU 141 in controlling the engine, charging system, and vehicle. CPU 141 communicates with various sensors and actuators 146 via an input/output (I/O) interface 140. Some ECU 50 architectures do not contain MMU 142. If no MMU 142 is employed, CPU 141 manages data and connects directly to ROM 143, RAM 144, and KAM 145. Of course, the present disclosure could utilize more than one CPU 141 to provide engine control and ECU 50 may contain multiple ROM 143, RAM 144, and KAM 145 coupled to MMU 142 or CPU 141 depending upon the particular application.

Continuing to refer to FIG. 1, electronic control unit (ECU) 50 is provided to control engine 40 and components of the vapor recovery system. ECU 50 has a microprocessor 62, called a central processing unit (CPU) 141, in communication with memory management unit (MMU) 142. MMU 142 controls the movement of data among the various computer readable storage media and communicates data to and from CPU 62. The computer readable storage media preferably include volatile and nonvolatile storage in read-only memory (ROM) 143, random-access memory (RAM) 144, and keep-alive memory (KAM) 145, for example. KAM 155 may be used to store various operating variables while CPU 62 is powered down. The computer-readable storage media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by CPU 141 in controlling the engine, charging system, and vehicle. CPU 141 communicates with various sensors and actuators 146 via an input/output (I/O) interface 140. Some ECU 50 architectures do not contain MMU 142. If no MMU 142 is employed, CPU 141 manages data and connects directly to ROM 143, RAM 144, and KAM 145. Of course, the present disclosure could utilize more than one CPU 141 to provide engine control and ECU 50 may contain multiple ROM 143, RAM 144, and KAM 145 coupled to MMU 142 or CPU 141 depending upon the particular application.

According to an embodiment of the present disclosure, PHEV 10 is prevented from drive away or from rolling away when external power cord 110 is plugged into receptacle 38 or charging is occurring. There are several alternative conditions indicating charging and/or an external cord is attached to PHEV10:

1) a signal from pin switch 108 indicates that plug 112 (of external power supply cord 110) is depressing switch 108;
2) a signal from access door switch 105 indicates that access door 100 is open. (It is possible, of course, for door 100 to be open without a plug being coupled to receptacle 38. It might be useful to provide a warning light or sound to indicate that the vehicle is not operable until access door 100 is closed);
3) a determination that current is flowing to or through battery charger 40; and/or
4) a determination that a voltage source is coupled to receptacle 38.

If a condition is determined indicating that an external supply cord 110 is coupled with receptacle 38, the vehicle will be prevented from driving or rolling away by:

1) preventing the parking brake from being released; and/or
2) preventing gear shift selector 128 from moving from a parked position.

The parking brake may be a traditional hand or foot operated parking brake that is connected to a cable 68 which acts upon pads 62 to restrain at least one wheel of the vehicle from operating. Alternatively, an electric parking brake can be employed. In yet another alternative, an anti-lock brake system of the vehicle can be employed to act as a parking brake. Gear shift selector 128, in a typical automatic-transmission equipped vehicle, is linked to a pawl 46 which engages with parking gear wheel 44 (coupled to the transmission) when in a park position. When pawl 46 is engaged with parking gear wheel 44, the transmission is prevented from moving. In the present disclosure, parking gear wheel 44 is coupled to the transmission in one embodiment. However, parking gear wheel 44 may be coupled to any driveline component of the vehicle that prevents rotation of the wheels when locked. Depending on the vehicle architecture, the driveline may include: a transmission, a driveshaft, a differential (a type of transmission), and the wheels. Herein, the driveline refers to components, which if locked in place, lock at least one wheel of the vehicle. Note that in typical automatic-transmission equipped vehicles, the vehicle operator is unable to remove the key from the vehicle when the gear shift selector 128 is not in park. Thus, it is likely that the vehicle operator encounters the car with gear shift selector 128 already in park unless the key has been left in the ignition.

Vehicles equipped with manual transmissions typically do not have a parking gear wheel 44 and pawl 46. However, it is possible to provide such equipment on a manual-transmission vehicle. When provided, the manual-transmission equipped vehicle can be restrained in a fashion similar to that of an automatic-transmission equipped vehicle.

Anti-lock braking systems (ABS) operate by applying the service brakes under control of ECU 50. The ECU commands application of hydraulic pressure to hydraulic cylinders acting on brake pads 62. In normal service, the hydraulic pressure is applied by the operator depressing a brake pedal 132. However, when wheel slippage or locking is sensed, ABS mode is activated and ECU 50 can apply hydraulic pressure independently of the operator control to pulse the hydraulic pressure to provide traction control or the anti-locking braking function. According to an embodiment of the present disclosure, the ABS can be used in an alternative manner similar to traction control as a parking brake to lock one or more wheels. An ABS system is described in U.S. Pat. No. 5,403,078 and incorporated by reference herein in its entirety.

In other embodiments, charging is prevented when the vehicle has not been parked. PHEV 10 is determined to be parked when gear shift selector 128 is placed in the park position, thereby causing pawl 46 to engage with parking gear wheel 44. Alternatively, pawl 46 is caused to engage with parking gear wheel 44 by another actuator than a gear shift selector. In yet another embodiment, a parked condition is based on whether a parking brake is set thereby preventing rotation of at least one of the vehicle's wheels. The parking brake can be a standard hand or foot operated brake. In such case, a brake set switch provides an indication to ECU 50 that the parking brake is set. Alternatively, an electric park brake is applied either under operator control by operator activation of a switch or under control by ECU 50. In either case, ECU 50 is provided a signal indicating that electric park brake is set. In yet another alternative, an ABS system can be used in a parking brake mode.

Only when the vehicle is determined to be parked does ECU 50 allow charging. In one embodiment, ECU allows access door 100 to open by commanding access door release solenoid 104 to an unlocked position thereby allowing external power supply cord 110 to couple with receptacle 38. In another embodiment, external power supply cord 110 is able to couple with receptacle 38 whether or not the vehicle is parked.

However, battery charger 40 is provided with a relay 118, which is closed under control of ECU 50 only when ECU 50 determines that PHEV 10 is in a parked condition. In one embodiment, an indicating light flashes or a speaker beeps to indicate to the operator that although the external power supply cord 110 is coupled with receptacle 38, charging is not occurring.

In yet another alternative shown in FIG. 5, receptacle 38 is provided with a plug ejector 188. When an operator attempts to couple an external power supply cable 110 to receptacle 38 when PHEV is not parked, solenoid 190 is activated so that pin 192 of solenoid 190 retracts outward ejecting a plug (such as 112 in FIG. 4). Only when PHEV 10 is parked, does solenoid 190 remain in the position shown in FIG. 5 which allows coupling of a plug with receptacle 38. Alternatively to acting as a plug ejector, solenoid 190 may act as a plug preventer by being actuated to its extended position to prevent coupling of a plug with receptacle 38 prior to a plug in attempt.

Figure 6:
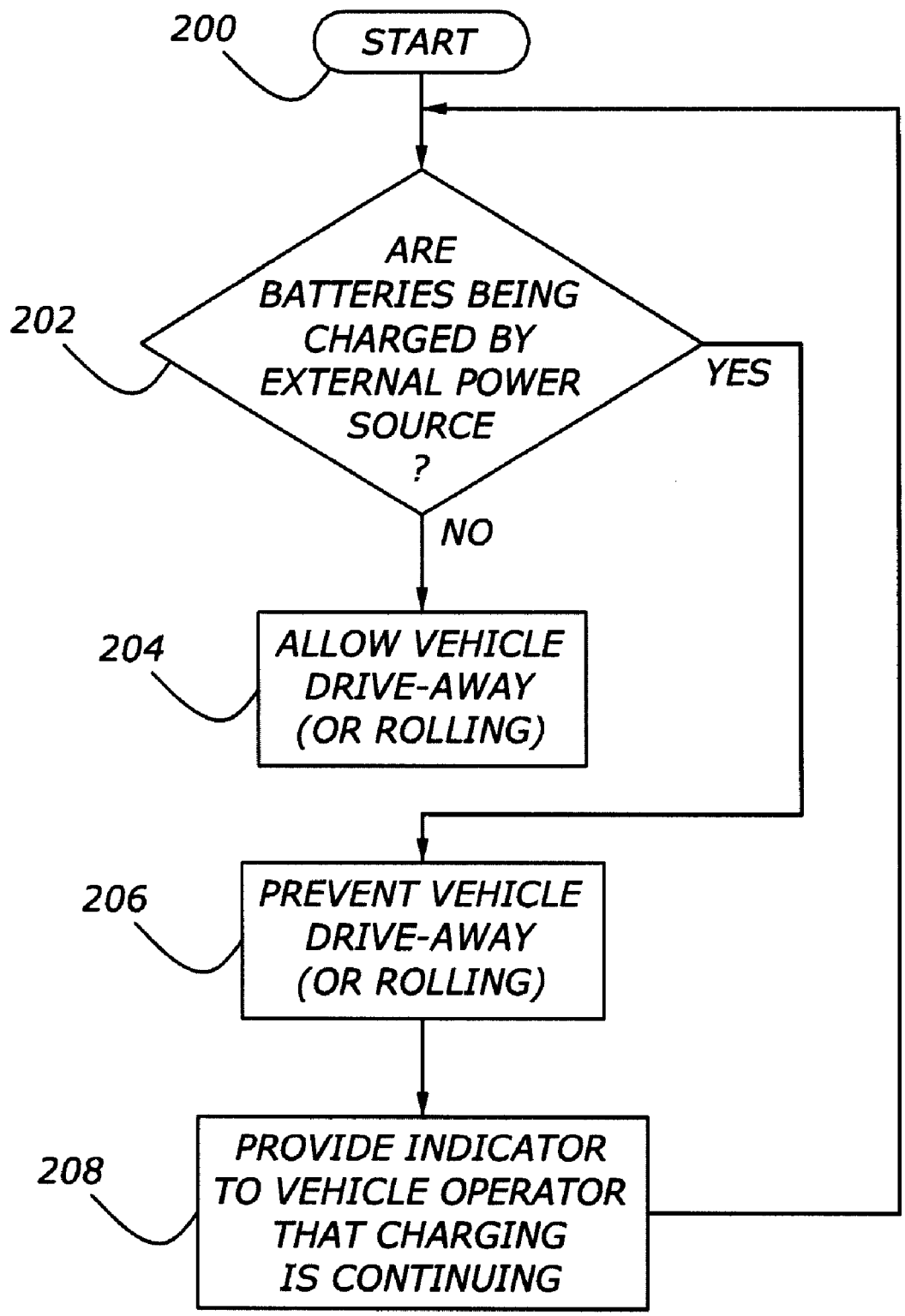
FIGS. 6 and 7 are flowcharts of embodiments of the present disclosure.

In FIG. 6, a flowchart illustrates an embodiment of the present disclosure. After starting the algorithm at 200, it is determined whether the batteries are being charged by an external power source at 202. Several methods and systems for indicating this are described above. If charging is not occurring, then drive away or roll away of the vehicle is allowed in 204. If charging is detected in 202, control passes to 206 in which the vehicle is prevented from moving; several methods and system to do so are described above. Control passes to 208 in which an indication is provided to the operator indicating that charging is continuing, possibly indicating that the cord is still connected. Control continues to pass back to 202 until charging is no longer detected.

Figure 7:
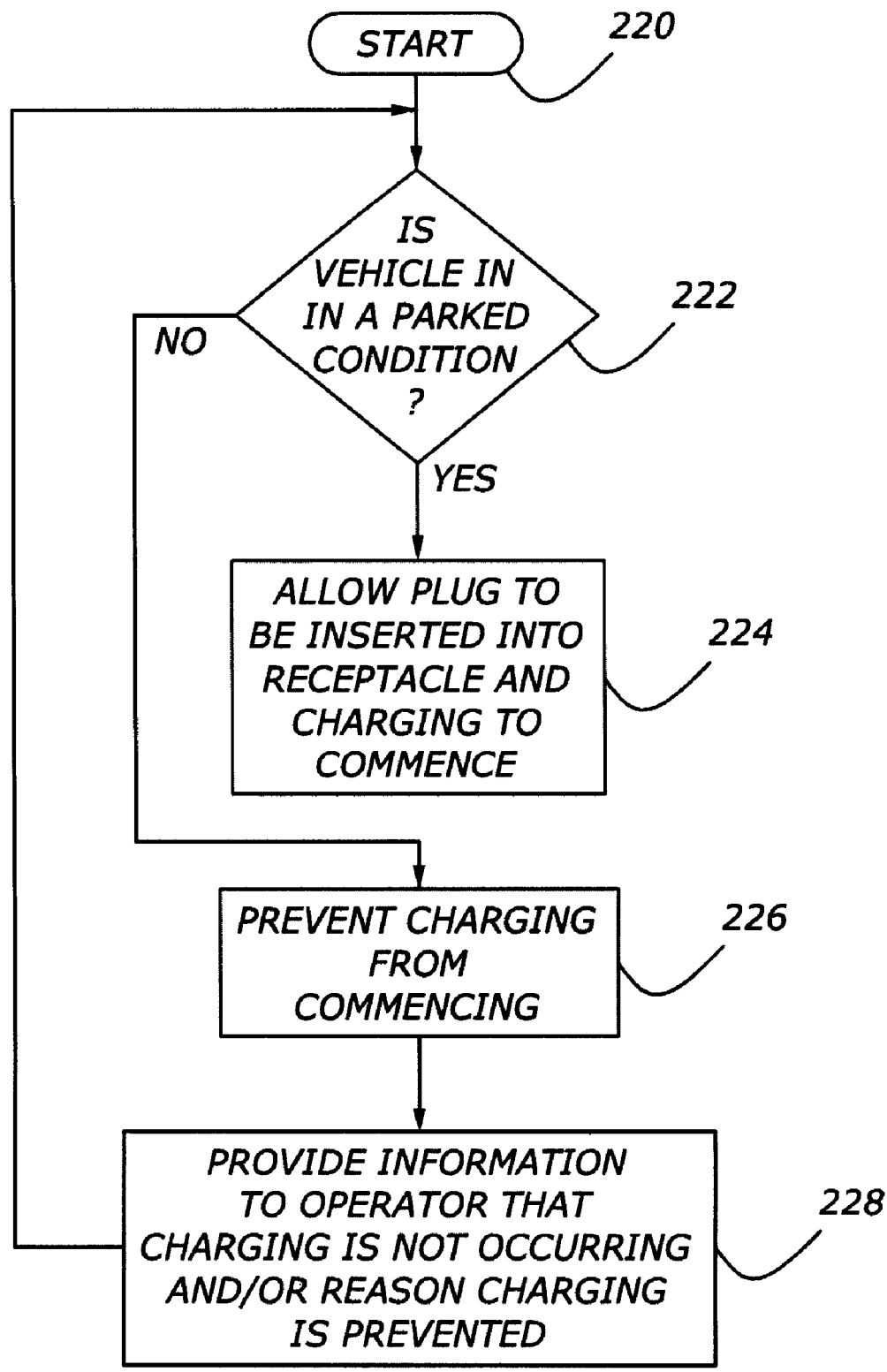

In FIG. 7, a flowchart illustrates an embodiment of the present disclosure starting at 220. Control passes to 222 where it is determined whether the vehicle is in a parked condition (systems and methods for making such a determination are discussed above). If the vehicle is parked, control passes to 224 and coupling of the plug and commencing of charging are allowed. If the vehicle is determined not to be parked in 222, control passes to 226 in which charging is prevented (systems and methods for doing do are discussed above). Control passes to block 228 in which information is provided to indicate that charging is not occurring and/or the reason that charging cannot be initiated.

While the best mode has been described in detail with respect to particular embodiments, those familiar with the art will recognize various alternative designs and embodiments within the scope of the following claims. Various embodiments may have been described as providing advantages or being preferred over other embodiments with respect to one or more desired characteristics, however as one skilled in the art is aware, one or more characteristics may be compromised to achieve desired system attributes, which depend on the specific application and implementation. For example, much of the discussion above is directed toward a PHEV application. However, many of the embodiments described apply to electric vehicles as well. Also, parking gear wheel 44 and pawl 46 are shown applied to gear 26 in FIG. 4. However, parking gear wheel 44 could be applied to any portion of the final drive, including ring gear 20 of transmission 18. Some embodiments are more readily applied to a vehicle having an automatic transmission due to the hardware available on a typical automatic-transmission equipped vehicle. However, such embodiments also apply to a manual transmission and vice versa. Various embodiments may have tradeoffs that include, but are not limited to: cost, strength, durability, life cycle cost, marketability, ease of use, appearance, weight, packaging, size, serviceability, manufacturability, ease of assembly, etc. Embodiments described herein that are characterized as less desirable than other embodiments or prior art implementations with respect to one or more characteristics are not outside the scope of the disclosure and may be desirable for particular applications.

What is claimed:

1. A method to prevent vehicle movement when an onboard battery is being charged, comprising:
    engaging a pawl with a parking gear wheel coupled to a driveline of the vehicle when an external power supply cord is plugged into a battery charging receptacle of the vehicle.

2. The method of claim 1 wherein:
    the pawl is coupled to a gear shift selector;
    the gear shift selector has a park position in which the pawl is engaged with the parking gear wheel; and
    wherein the method further comprises preventing disengagement of the pawl by preventing the gear shift selector from moving out of the park position.

3. The method of claim 1 wherein the receptacle comprises a plug detector switch providing an indication of whether a plug is coupled to the receptacle; and wherein the method further comprises preventing a gear shift selector from being released based on a signal from the plug detector switch.

4. The method of claim 3 wherein the plug detector switch comprises a pin switch, which is depressed when a plug end of the external power supply cord is coupled with the receptacle.

5. The method of claim 1, further comprising preventing a gear shift selector from being released when current is being supplied to the battery from the receptacle.

6. The method of claim 1, further comprising preventing a gear shift selector from being released when a voltage source is coupled to the receptacle.

7. The method of claim 1, wherein the vehicle further comprises:
   an electric motor;
   a transmission coupled to the electric motor; and
   an internal combustion engine coupled to the transmission;
   the method further comprising:
   disabling the electric motor and the internal combustion engine while the external power supply cord is plugged into the receptacle.

8. A vehicle having a traction motor coupled to a battery, comprising:
   a receptacle coupled to the battery and adapted to couple with a plug of an external power supply cord to charge the battery;
   a parking gear wheel; and
   a pawl adapted to engage with the parking gear wheel to prevent rotation of the parking gear wheel when a plug is coupled with the receptacle or an access door proximate the receptacle is open.

9. A vehicle system, comprising:
   a traction motor coupled to a battery;
   a parking gear wheel;
   a pawl that selectively engages the parking gear wheel during charging of the battery by an external power supply;
   an operator-actuated gear shift selector coupled to the pawl; and
   a solenoid proximate the gear shift selector and adapted to lock the gear shift selector in place during charging of the battery by the external power supply.

10. A method to prevent a battery-powered vehicle from moving when the battery is being charged by an external power source, the vehicle having a battery, a battery charger coupled to the battery and to a receptacle, a pawl adapted to be engaged with a parking gear wheel coupled to a driveline of the vehicle, and a gear shift selector coupled to the pawl, the gear shift selector having a park position in which the pawl is engaged with the parking gear wheel, the method comprising:
    detecting a vehicle condition indicating that an external power supply cord is plugged into the receptacle;
    detecting whether a brake pedal coupled to the vehicle is being actuated;
    detecting whether an ignition key switch coupled to the vehicle is actuated;
    preventing the gear shift selector from moving out of the park position when any one of: the vehicle condition is detected, the brake pedal is unactuated, and the ignition key switch is unactuated.

11. The method of claim 10 wherein detecting a vehicle condition comprises one of:
    detecting a voltage supply source coupled with the receptacle;
    detecting a current flow to the battery charger from an external source;
    determining that a plug is coupled to the receptacle by a plug detector; and
    determining that an access door proximate the receptacle is open.

* * * * *